United States Patent
Blasiak et al.

[11] Patent Number: 6,067,197
[45] Date of Patent: May 23, 2000

[54] DIFRACTION GRATING HAVING ENHANCED BLAZE PERFORMANCE AT TWO WAVELENGTHS

[75] Inventors: Thomas C. Blasiak, Rochester; Semyon L. Zheleznyak, Penfield, both of N.Y.

[73] Assignee: Spectronic Instruments, Inc., Rochester, N.Y.

[21] Appl. No.: 09/219,031

[22] Filed: Dec. 23, 1998

[51] Int. Cl.[7] ................................. G02B 5/18; H01S 3/08
[52] U.S. Cl. ..................... 359/571; 359/569; 359/572; 359/900; 372/102
[58] Field of Search .................... 359/566, 569, 359/571, 572, 900; 372/102

[56] References Cited

U.S. PATENT DOCUMENTS

| | | | |
|---|---|---|---|
| 3,942,873 | 3/1976 | Shimotakahara | 359/571 |
| 4,229,710 | 10/1980 | Shoshan | 359/571 |
| 4,736,360 | 4/1988 | McMahon | 385/37 |
| 5,349,471 | 9/1994 | Morris et al. | 359/565 |
| 5,418,803 | 5/1995 | Zhiglinsky et al. | 372/102 |
| 5,461,471 | 10/1995 | Sommerfeld | 356/3 |
| 5,682,265 | 10/1997 | Farn et al. | 359/571 |
| 5,770,120 | 6/1998 | Kamihara et al. | 264/1.27 |
| 5,838,480 | 11/1998 | McIntyre et al. | 359/205 |

FOREIGN PATENT DOCUMENTS

| | | | |
|---|---|---|---|
| 2001776 | 2/1979 | United Kingdom | 372/102 |

OTHER PUBLICATIONS

G. R. Harrison, et al., "Echelle Gratings: Their Testing and Improvement", Applied Optics, vol. 15, No. 4, pp. 971–976, Apr. 1976.

E. G. Loewen, et al., "Grating Efficiency Theory as it Applies to Blazed and Holographic Gratings", Applied Optics, vol. 16, No. 10, pp.2711–2721, Oct. 1977.

C. H. Palmer, "Anomalous Behavior of Gratings as Skew Incidence", Applied Optics, vol. 7, No. 2, pp. 353–356, Feb. 1968.

*Primary Examiner*—Cassandra Spyrou
*Assistant Examiner*—John Juba, Jr.
*Attorney, Agent, or Firm*—Harris Beach & Wilcox, LLP.

[57] ABSTRACT

An echelle grating having a groove facet angle and groove periodicity such that for laser-emitted light of two different wavelengths the highest propagating diffraction order is blazed and the next higher order is non-propagating such that the intensity of each blazed order is enhanced. In an example, the 84th diffraction order of a KrF excimer laser emitting at 248.4 nm and the 108th diffraction order of an ArF excimer laser emitting at 193.3 nm will both be blazed when the groove spacing d is 0.010623 mm, corresponding to a frequency f of 94.13 grooves per mm, and the groove facet angle $\theta_g$ is about 80°, whereas the next higher order for each laser, i.e., the 85th and 109th orders, respectively, are non-propagating, and thus both blaze orders are enhanced.

16 Claims, 6 Drawing Sheets

DIFFRACTION GRATING HAVING ENHANCED BLAZE PERFORMANCE AT TWO WAVELENGTHS

DESCRIPTION

The present invention relates to optical gratings for diffracting beams of light, more particularly to echelle gratings, and most particularly to a Littrow-oriented echelle grating having blaze performance at two separate wavelengths enhanced through passing-off extinction of the next-higher diffraction order at each wavelength.

A diffraction grating is an arrangement of reflecting or transmitting elements spaced apart by a distance comparable to the wavelength of light under study, for example, a regular pattern of equally-spaced transparent slits or apertures in an opaque screen or a collection of reflecting grooves on a substrate. An electromagnetic wave incident upon a grating will, upon diffraction, have its electric field amplitude or phase, or both, modified in a predictable manner.

The present invention is directed to electromagnetic radiation, referred to herein as "light," which is very nearly monochromatic, such as may be emitted from an excimer gas laser, and to diffraction of that radiation by linear gratings having triangular grooves, each groove comprising first and second facets disposed at a given angle to each other and to the longitudinal axis or plane of the grating. Such a triangular grating presents a stair-step appearance in cross-sectional view.

When monochromatic light is incident on a grating surface, the light is diffracted in discrete angular directions. Each grating groove may be thought of as a very small, slit-shaped source of diffracted light. The light wavelet diffracted by each groove interferes with the light from other grooves to form a diffracted wavefront. The usefulness of a grating depends on the fact that there exists a unique set of discrete angles, known as "orders," along which, for a given spacing d between grooves, the diffracted light wavelet from each groove facet is in phase with the wavelet diffracted from every other groove facet, so that the wavelets interfere constructively. Only that light impinged on a grating at an incidence angle $\alpha$ and diffracted along a diffraction angle $\beta$ for which the groove spacing d times the sum of the sines of $\alpha$ and $\beta$ equals an integral multiple m of the wavelength $\lambda$ is diffracted constructively, m thus being a constructive diffraction order number. These parameters are related in the grating equation:

$$m\lambda = d(\sin \alpha + \sin \beta) \qquad \text{(Eq. 1)}$$

The present invention concerns a class of linear diffraction gratings known as echelle gratings, or echelles. Such gratings have first and second facets of unequal length, the ratio of lengths being typically between about 2:1 and 6:1, with about 4:1 being commonly used in the art. This ratio is known as the r number of a grating; thus, for example, an r-4 grating has a second, or short, facet angle of 75°58' with respect to the longitudinal axis of the grating. Further, an echelle generally exhibits the incident beam and the blaze diffracted beam on the same side of a plane normal to the longitudinal axis of the grating. Echelles are relatively coarse, precisely fabricated gratings which are used generally at high angles of diffraction and in high-number spectral orders. Typical groove spacings are between about 20 and about 300 grooves per millimeter. Angles of incidence typically are between about 63° (r-2) and about 80° (r-6) from the grating normal, and spectral orders used are between about 10 and 500, commonly around 100. Echelles are especially useful in applications requiring a high degree of optical dispersion and resolution.

The intensity of light, or the amount of radiant energy, contained in each diffraction order, normalized to the intensity of the incident beam, is known as the "efficiency" of diffraction in that order. The diffraction orders of a grating for any given wavelength of light do not contain equal amounts of energy, and most orders contain very little energy. For each grating, however, and for each wavelength impinged at a given incident angle, there is one order which contains the highest amount of diffracted energy, known in the art as the "blaze order." Orders angularly displaced on either side of the blaze order (m+1 and m−1) may or may not also contain substantial amounts of energy.

Orders which are capable of propagating diffracted light are those wherein the diffracted beam can escape the grating. Orders which are angularly disposed in directions extending into the grating, referred to in the art as being "below the horizon," cannot propagate diffracted light. An echelle grating specially positioned such that the blaze order diffracted beam and the incident beam occupy the same path in space (incident angle $\theta_i$ equals the diffracted angle $\theta_d$) is said to be in "Littrow" configuration. For a Littrow-oriented grating, the angle of the blaze order $\theta_B$ is approximately equal to the facet angle $\theta_G$ which is equal to the arctangent of the grating r number. In this configuration, the grating equation (Eq. 1) may be restated as:

$$m\lambda = 2d \sin \theta_B (\text{Littrow}) \qquad \text{(Eq. 2)}$$

It is an interesting property of a Littrow-configured echelle grating that when the incident angle is set such that the blaze angle is the highest-numbered propagating order, that order contains somewhat more energy than it contains when in other angular locations and than would be predicted by scalar theory, referred to in the art as an "anomaly condition." Radiation from that blaze angle is said to be "enhanced." Because energy must be conserved, the energy which would be diffracted into non-propagating orders is redistributed into the propagating orders, of which the adjacent blaze order is allocated the most energy.

An echelle grating can be useful, for example, as an optical element in a gas laser cavity wherein the echelle may form one end of the cavity and may be rotated about an axis through the echelle and normal to the laser beam to tune the laser to the wavelength of maximum response. Gas lasers in particular are not entirely monochromatic because of, e.g., Doppler effects resulting from the distribution of velocities of the collection of gas molecules during photon emission. In some laser applications, for example, in the manufacture of computer circuits, it is highly desirable to narrow the spectral output of the laser. This may be readily accomplished through use of a highly-dispersive echelle grating used in the Littrow configuration which can reject the outer wavelengths of the laser distribution and diffract into the cavity for amplification a substantially narrowed wavelength band. This is known in the art as "line narrowing." A suitable grating for this purpose is an r-5 grating such as the 35-13-*-406 grating having 85.84 grooves per mm, available from Richardson Grating Laboratory, a unit of Spectronic Instruments, Inc., Rochester, N.Y. USA.

It is further highly desirable that the blaze order available for laser tuning and line-narrowing be the highest-numbered propagating order and thus enhanced as described supra. In the known art, a grating such as the above-cited Richardson grating having a given spacing d can be oriented such that the enhanced blaze order is available to only a single wavelength. For example, the 85.84 g/mm grating can be Littrow-mounted such that the blaze order (92) of light of 248.4 nanometers wavelength, as is produced by a krypton-fluorine (KrF) excimer laser, is propagated and the next-higher (93rd) order is non-propagated. This grating is also useful for line-narrowing of an argon-fluorine (ArF) excimer laser at 193.3 nm, but the blaze order (in the Littrow configuration) is not enhanced. In the known art, a different Littrow-mounted echelle grating designed to exhibit blazing at 193.3 nm would not do so at 248.4 nm.

Diffraction gratings are very difficult, expensive, and time-consuming to manufacture, and there exist in the entire world only a very few ruling engines capable of making very high quality gratings. Thus, it is highly desirable to provide an echelle grating capable of enhanced blaze behavior at two different wavelengths of light.

It is a principal object of the invention to provide an improved echelle diffraction grating which is capable of enhanced blaze diffraction of laser light emitted at two different wavelengths in two different diffraction orders.

It is a further object of the invention to provide an improved echelle diffraction grating which is capable of enhanced blaze diffraction of light from both a KrF excimer laser and an ArF excimer laser.

It is a still further object of the invention to provide an improved method for determining the optimum groove spacing and groove facet angle for an echelle diffraction grating to permit enhanced blaze diffraction of laser light emitted at two different wavelengths in two different diffraction orders.

Briefly described, an echelle grating in accordance with the invention has a specific groove spacing d and groove angle $\theta_g$ which satisfy Eq. 2 within an acceptably small margin for two different laser light wavelengths $\lambda_1$ and $\lambda_2$ and two different corresponding diffraction orders $m_1$ and $m_2$ wherein both orders are blaze orders and the next-higher order is non-propagating. For example, a known KrF laser emits at substantially 248.4 nm and a known ArF laser emits at substantially 193.3 nm. Through a novel method disclosed infra, we have found that the 84th order of the KrF laser and the 108th order of the ArF laser will both blaze when d is 0.010623 mm, corresponding to a frequency f of 94.13 grooves per mm, and $\theta_g$ is about 80° (r-5). According to Eq. 2, $m_{ArF}\lambda_{ArF}$ must equal $m_{KrF}\lambda_{KrF}$. Multiplying the appropriate values, we find that $m_{ArF}\lambda_{ArF}$=20866 nm, and $m_{KrF}\lambda_{KrF}$=20876 nm. The agreement within 100 parts per million is sufficient to permit both orders to blaze. In addition, the method shows that the next higher order for each laser, i.e., the 85th and 109th orders, respectively, are non-propagating, and thus both blaze orders are enhanced.

The foregoing and other objects, features, and advantages of the invention, as well as presently preferred embodiments thereof, will become more apparent from a reading of the following description in connection with the accompanying drawings in which.

Figure 1:
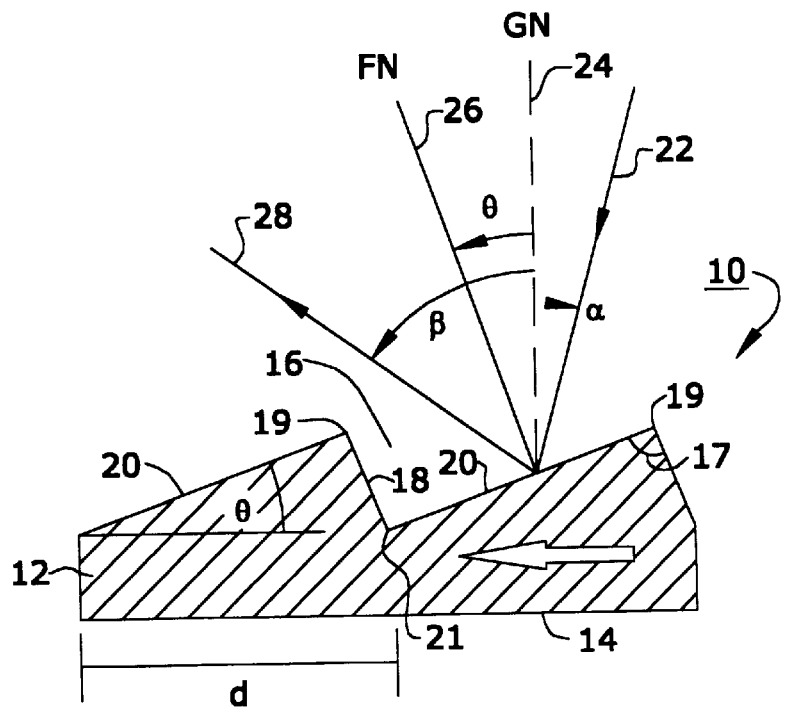
FIG. 1 is a cross-sectional view of a linear triangular diffraction grating.

Referring to FIG. 1, a schematic linear triangular-groove reflection diffraction grating 10, shown in cross-sectional view, is formed of a reflective material, for example, aluminum or aluminized glass in accordance with the known art. Grating 10 has a slab body 12 having a planar rear surface 14 defining a grating reference surface. A front surface opposite rear surface 14 is featured with a plurality of highly parallel triangular grooves 16 formed by the edge intersections of first and second facets 18 and 20, respectively. The facets meet preferably at nearly a 90° included apex angle 17 at their intersections 19. Facets 20 are inclined to reference surface 14 at an angle $\theta_g$ and grooves have a period d. Light beam 22 is incident upon all second facets 20 at an angle α as measured from the grating normal plane 24 which is normal to reference surface 14, and is diffracted at many order angles, the only one shown being angle β, also measured from grating normal 24, which in the example shown is also the blaze direction. Facet normal 26 bisects the included angle between the incident and diffracted rays. Blaze order propagation is in the direction indicated by arrow 28.

Figure 2:
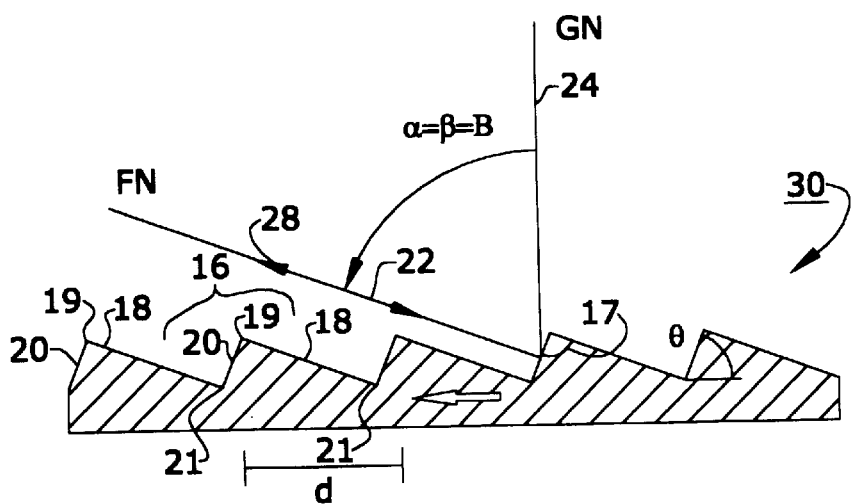
FIG. 2 is a cross-sectional view of an echelle diffraction grating.

Referring to FIG. 2, an echelle grating 30 is shown disposed in Littrow configuration wherein α=β, and both the incident beam and the diffracted wavelet are coincident with the facet normal.

Figure 3:
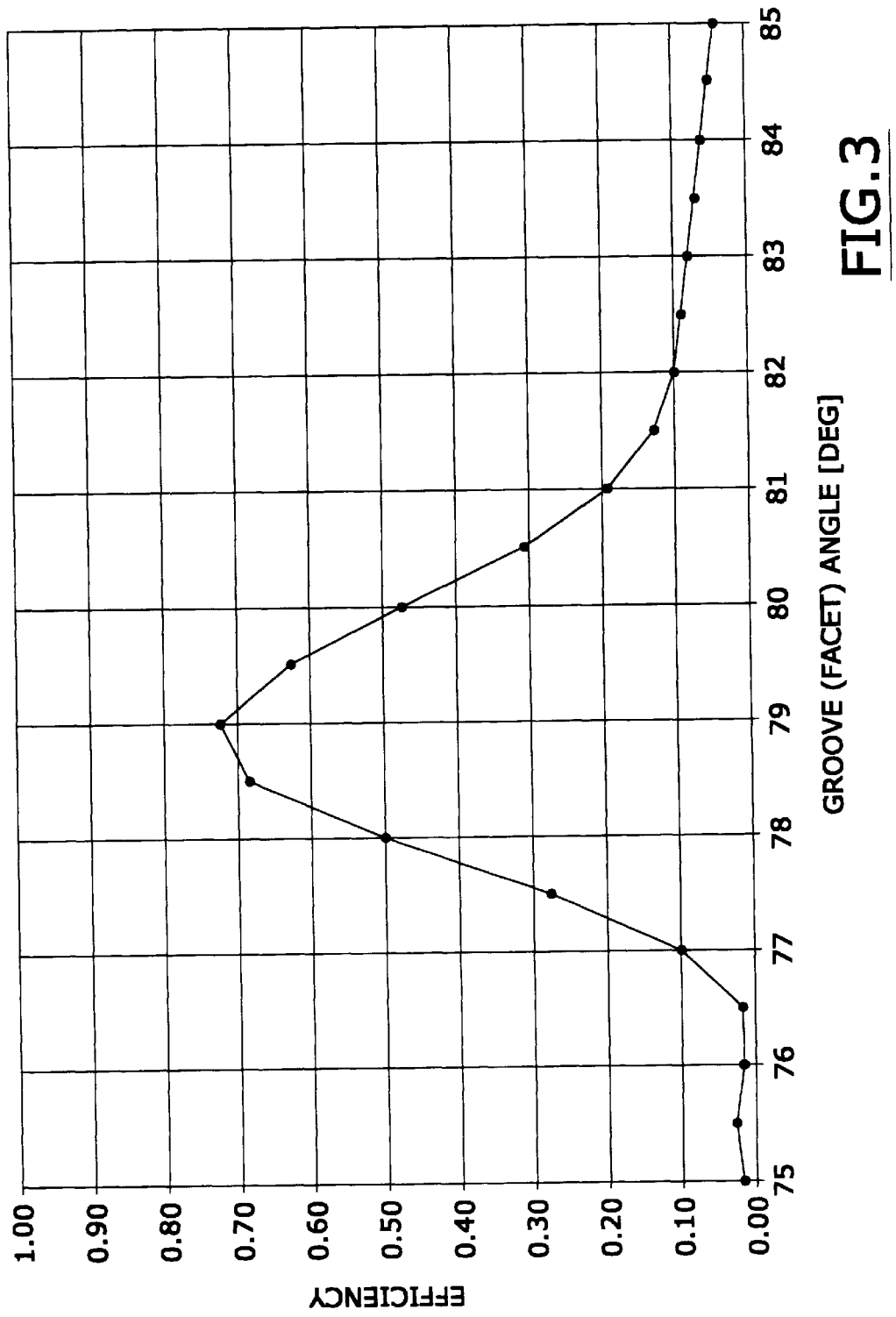
FIG. 3 is a graph of calculated diffraction efficiency versus groove facet angle for blaze order 122 of an ArF excimer laser emitting light at 193.3 nm when diffracted by a prior art echelle grating having 83.14 grooves per mm.
Figure 4:
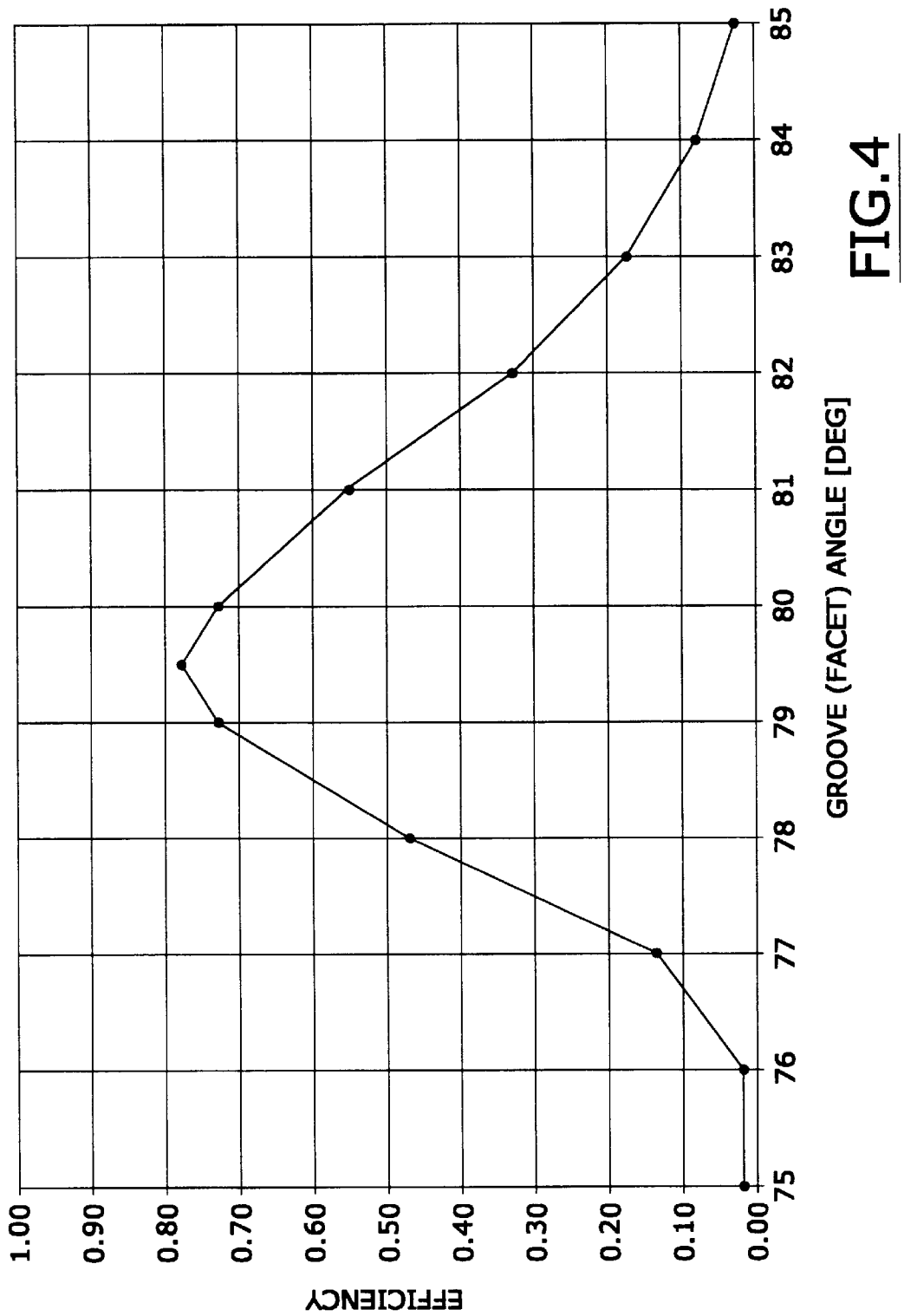
FIG. 4 is a graph of calculated diffraction efficiency versus groove facet angle for blaze order 95 of a KrF excimer laser emitting light at 248.4 nm when diffracted by a prior art echelle grating having 83.14 grooves per mm.

When grating 30 is provided with d of 0.012028 (83.14 grooves per mm), $\theta_g$ of about 79°, and a groove apex angle of about 85°, the 95th order of a KrF laser blazes at an efficiency of about 75%, as shown in FIG. 4. The 96th order is non-propagated, and the 95th order blazing is enhanced thereby. With the same grating, the 122nd order of an ArF laser blazes at an efficiency of about 72%, as shown in FIG. 3; however, the 123rd order is also propagated and the 122nd order blazing thus is not enhanced.

Figure 5:
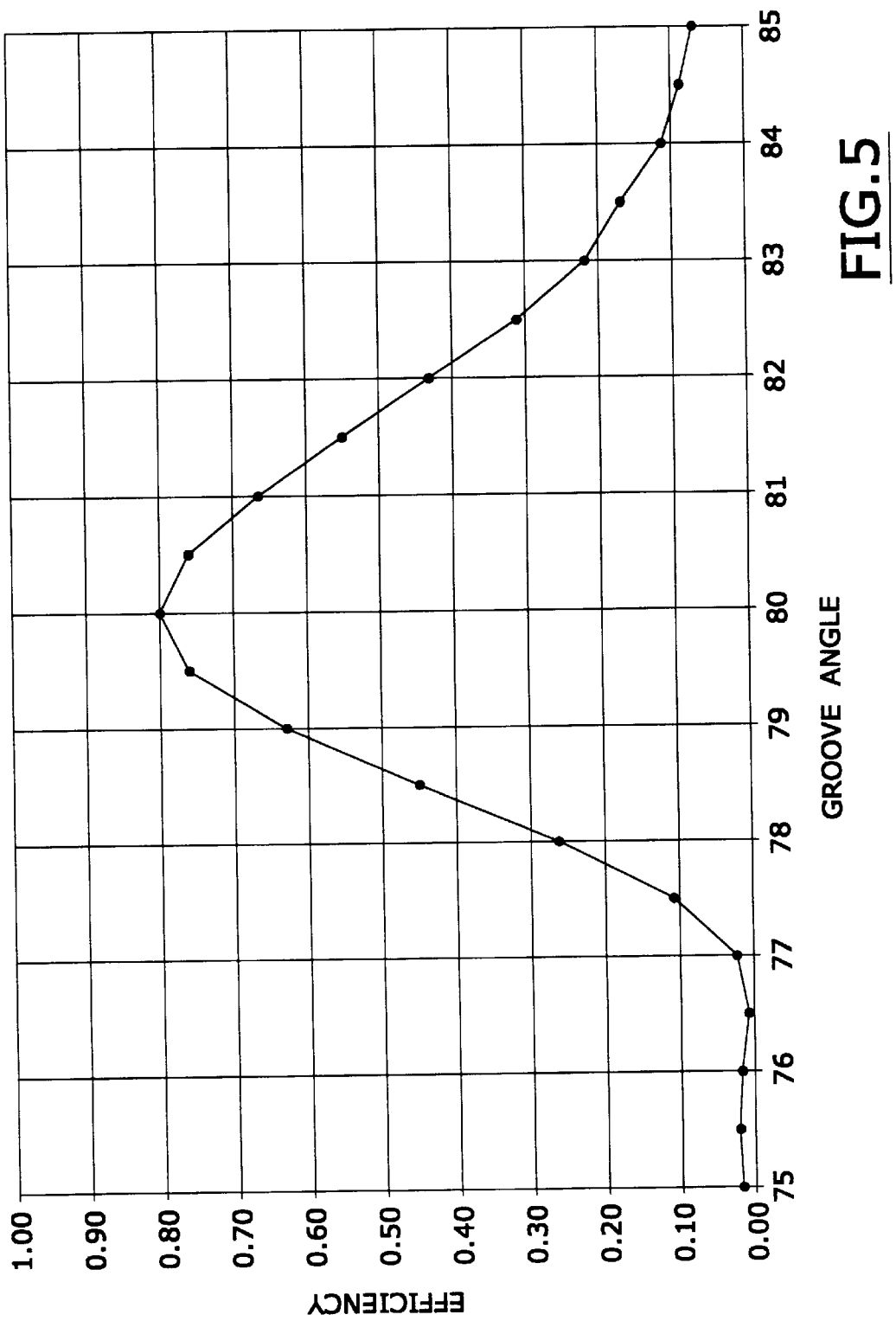
FIG. 5 is a graph like that shown in FIG. 3 for an echelle grating in accordance with the invention having enhanced blaze order 108 when diffracted by a grating having 94.13 grooves per mm.
Figure 6:
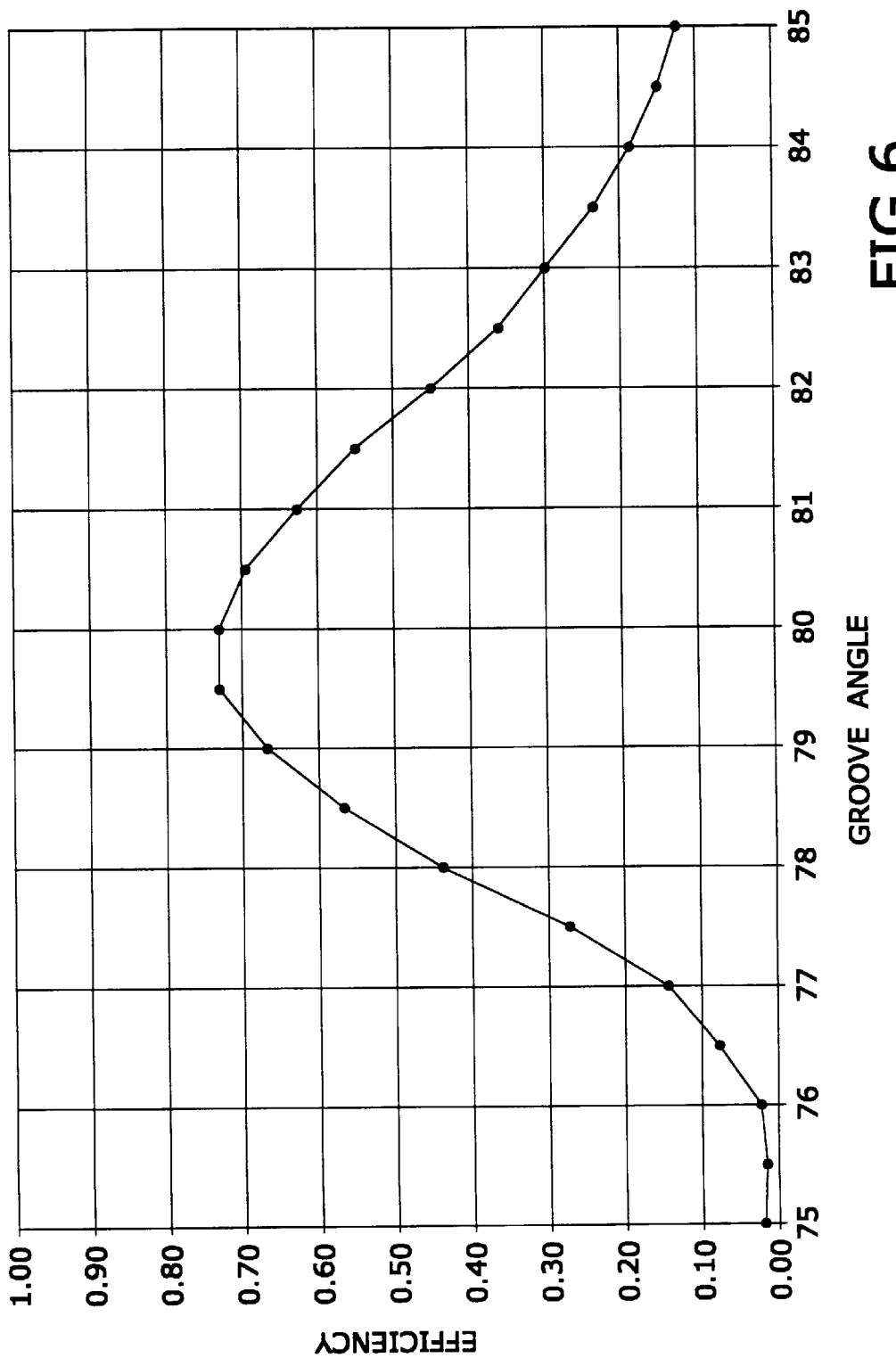
FIG. 6 is a graph like that shown in FIG. 4 for an echelle grating in accordance with the invention having enhanced blaze order 84 when diffracted by a grating having 94.13 grooves per mm.

As described supra, when grating 30 is provided in accordance with the invention with d of 0.010623 mm (94.13 grooves per mm), $\theta_g$ of about 80°, and a groove apex angle of 85°, the 84th order of a KrF laser blazes at an efficiency of about 73%, as shown in FIG. 6, and the 85th order is extinguished; and the 108th order of an ArF laser blazes at an efficiency of about 80%, as shown in FIG. 5, and the 109th order is extinguished. Thus, a single grating in accordance with the invention is capable of providing enhanced blazing at a plurality of incident wavelengths.

Our method for determining the design parameters for a dual-wavelength enhanced-blazing grating is as follows.

First, choose Littrow geometry for the grating mounting, wherein the blaze angle $\theta_B$ is equal to the incidence angle α and the diffraction angle β. Select a starting value for groove spacing d such that the blaze angle $\theta_B$ is substantially equal to the groove angle $\theta_G$ (blaze beam follows the facet normal).

Second, determine the two wavelengths of interest, $\lambda_1$ and $\lambda_2$, and assign $\lambda_1$ to the shorter wavelength.

Third, select a range of operating order numbers $m_1$ for the shorter wavelength which are around 100, for example, 80<m<140. These imposed values of $m_1$ are all integers.

Fourth, assume that $\theta_B$ will be near but not identical for both wavelengths, and determine values of $m_1$ and $m_2$ in the range for which $\theta_{B\lambda1}/\theta_{B\lambda2}$ is most nearly 1.0, as follows. Consistent with Eqs. 1 and 2, sin $\theta_B$ is proportional to $m\lambda$, thus where $\theta_{B1}$<or>$\theta_{B2}$, then $m_1\lambda_1$<or>$m_2\lambda_2$. $m_2\lambda_2/m_1\lambda_1$ may be plotted as a function of the potential values of $m_1$. For values of $\theta_{B1}$<$\theta_{B2}$, find $m_2$ to be the integer value below $m_1\lambda_1/\lambda_2$, and for values of $\theta_{B1}$>$\theta_{B2}$, find $m_2$ to be the integer value below $(m_1\lambda_1/\lambda_2)+1$. Those values of $m_1$ for which $m_2\lambda_2/m_1\lambda_1$ is most nearly 1.0 are then reserved for further use.

Fifth, compute the groove frequency f (=1/d) for each order $m_1$ (from Step 4) where the next higher order does not propagate:

$$f=1/\{(m_1+1)\lambda_1 - m_1\lambda_1/2\} \qquad \text{(Eq. 3)}$$

N.B.: It is desirable to add a small constant value to each such groove frequency for the shorter wavelength to assure that the next higher order is beyond the horizon (>90°) and therefore cannot propagate. If the passing-off order for the shorter wavelength is assured, so then is the passing-off order for the longer wavelength.

Sixth, compute the difference in diffraction angles $\lambda_{B\lambda1} - \theta_{B\lambda2}$ for each groove frequency from Step 5, and select the groove frequency associated with the smallest positive difference in diffraction angles. The geometric parameters have now been specified for an echelle grating that will display enhanced blazing at both $\lambda_1$ and $\lambda_2$.

EXAMPLE

The groove frequency for an r-5 ($\theta_g$=80°) 85° apex angle echelle grating displaying enhanced blazing for both an ArF excimer laser ($\lambda_1$=193.3 nm) and a KrF excimer laser ($\lambda_2$=248.4 nm) was determined.

Figure 7:
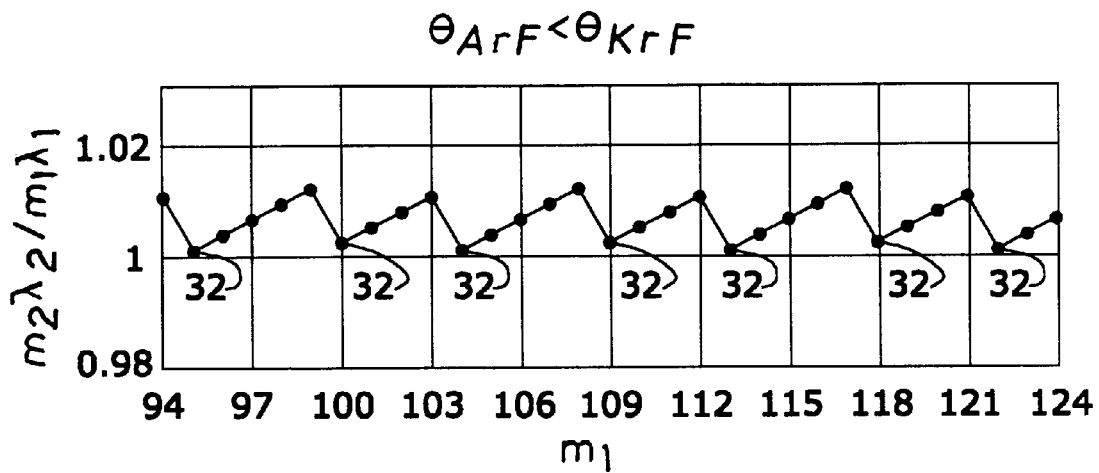
FIG. 7 is a plot of calculated order number $m_1$ versus relative blaze angle for the condition $\theta_{ArF} < \theta_{KrF}$.
Figure 8:
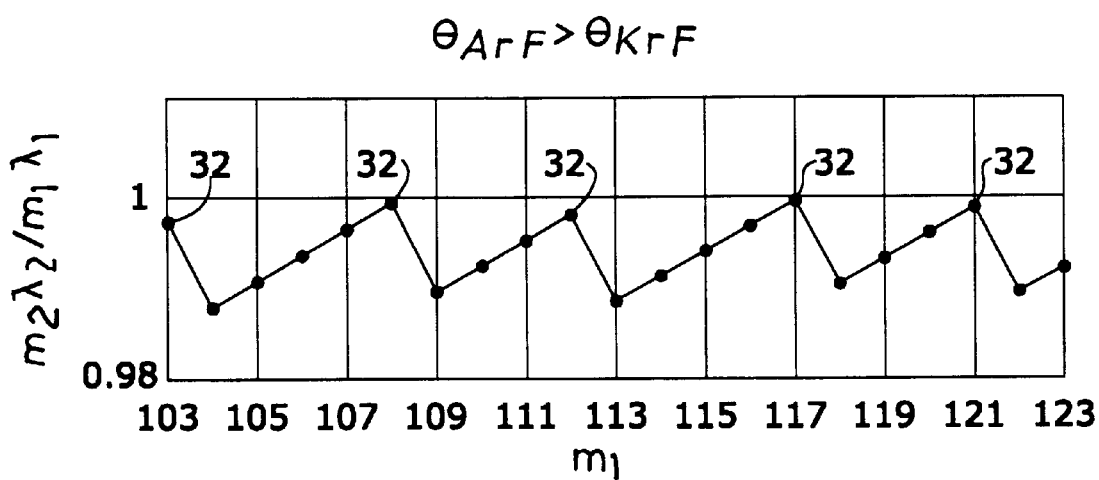
FIG. 8 is a plot of calculated order number $m_1$ versus relative blaze angle for the condition $\theta_{ArF} > \theta_{KrF}$.

Potential values of $m_1$ between 94 and 124 were examined in accordance with Step 4 above, and are shown plotted in FIGS. 7 and 8. Reasonable choices for the operating order number at 193.3 nm were those $m_1$ order numbers associated with values 32 of $m_2\lambda_2/\lambda_1$ nearest 1.0: 95, 100, 103, 104, 108, 109, 112, 113, 117, 118, 121, and 122.

The calculated results of following the method steps supra are shown in the following table:

| $m_1$ | $m_2$ | f (+.0007) | $\theta_{B\lambda1} - \theta_{B\lambda2}$ | |
|---|---|---|---|---|
| 100 | 78 | 0.10151 | −0.7 | |
| 103 | 80 | 0.09861 | +0.548 | |
| 104 | 81 | 0.09768 | −0.257 | |
| 108 | 84 | 0.09413 | +0.155 | Selected |
| 109 | 85 | 0.09328 | −0.66 | |
| 112 | 87 | 0.09083 | +0.54 | |
| 113 | 88 | 0.09004 | −0.234 | |
| 117 | 91 | 0.08702 | +0.162 | |
| 118 | 92 | 0.08629 | −0.623 | |
| 121 | 94 | 0.08419 | +0.533 | |
| 122 | 95 | 0.08351 | −0.214 | |

The optimum grating frequency f is seen to be 0.09413 grooves per micrometer (94.13 grooves per mm), having a blaze angle difference of only +0.155° between the optimum blaze angles for both lasers and providing an enhanced blaze angle in the 108th order for the ArF laser and in the 84th order for the KrF laser. It should be understood, however, that this is not a unique solution, only the optimal one for installations having a fixed incident angle $\alpha$. For example, it is seen that a grating having f=0.08702 and a blaze angle difference of +0.162 will enhanced blaze in orders 117 and 91, respectively.

A triangular grating in accordance with the invention may be formed by known methods and apparatus. For example, a master grating may be burnished in an aluminum substrate by a ruling engine. Such a grating normally is not useful directly for diffraction because material displaced in forming the grooves is accumulated on the outer groove apices, the inner groove apices being sharply formed by the ruling tool. Typically, a metallized (first generation) cast is made having inverted topography which is completely functional. A further metallized cast (second generation) thus becomes a duplicate master for the casting of third generation copies which are also completely functional and which may be manufactured and sold in commercial quantity. Thus all odd-generation copies comprise inverted topography.

An advantage of an echelle grating in accordance with the invention is that is can be readily tested for flatness by known techniques by using a known helium-neon (HeNe) laser emitting light at 632.8 nanometers incident on the grating within one degree of the intended use incident angle, preferably at about $\alpha$=79.36°.

From the foregoing description, it will be apparent that there has been provided an improved echelle diffraction grating, wherein two different enhanced Littrow blaze orders can be supported for incident laser-emitted light of two different wavelengths, and a method for determining the geometric parameters of such a grating. Variations and modifications of the herein described grating, in accordance with the invention, will undoubtedly suggest themselves to those skilled in this art. Accordingly, the foregoing description should be taken as illustrative and not in a limiting sense.

What is claimed is:

1. A planar reflective diffraction grating having an arrangement of triangular grooves formed by the intersections of first and second facets, said facets being inclined to said plane at such an angle and said arrangement having such a periodicity that for laser-emitted light of two different wavelengths having different propagating order numbers the highest propagating diffraction order is blazed for each wavelength and the next higher order is non-propagating such that each blazed order is enhanced.

2. A grating in accordance with claim 1 wherein said grating is an echelle grating.

3. A grating in accordance with claim 1 wherein said blazed order numbers are greater than 50.

4. A grating in accordance with claim 1 wherein said grating has an r value between about 2 and about 6.

5. A grating in accordance with claim 1 wherein the apex included angle is between about 80° and 90°.

6. A grating in accordance with claim 1 wherein one of said first and second facets is shorter than the other of said facets and wherein the angle formed between the shorter of said first and second facets and said grating plane is between about 75° and about 85°.

7. A grating in accordance with claim 6 wherein said facet angle is between 78° and 81°.

8. A grating in accordance with claim 1 wherein the frequency of said grooves is between about 0.083 and 0.107 grooves per micrometer.

9. A grating in accordance with claim 8 wherein said frequency is between about 0.093 and 0.095 grooves per micrometer.

10. A grating in accordance with claim 1 wherein at least one of said lights of two different wavelengths is emitted by a krypton-fluorine excimer laser.

11. A grating in accordance with claim 1 where at least one of said lights of two different wavelengths is emitted by an argon-fluorine excimer laser.

12. A grating in accordance with claim 1 wherein the enhanced blaze order for wavelength 193.3 nanometers is 108 and for wavelength 248.4 nanometers is 84.

13. A grating in accordance with claim 1 wherein said grating is suitable for testing for surface flatness at an incident-beam angle within one degree of the intended incident-beam angle for use, said incident beam having a wavelength of 632.8 nanometers.

14. A planar reflective echelle diffraction grating for enhanced blaze order diffraction of laser emitted light of two different wavelengths, comprising:
   a) a groove frequency of about 0.09413 grooves per micrometer;
   b) a facet angle of about 80° as measured from the plane of said grating; and
   c) a groove apex included angle of about 85°.

15. A method for forming an echelle diffraction grating for use in Littrow orientation to diffract laser-emitted light of first and second wavelengths $\lambda_1$ and $\lambda_1$, respectively, at first and second enhanced blaze diffraction angles $\theta_{B\lambda 1}$ and $\theta_{B\lambda 2}$, respectively, comprising the steps of:

a) selecting a facet angle between about 75° and about 85° and an apex angle between about 800 and 90° and assigning $\lambda_1$ to the shorter of said first and second wavelengths;

b) selecting a range of integral order numbers $m_1$ for said shorter wavelength;

c) determining values of $m_1$ and $m_2$ in said range for which values the ratio $\theta_{B\lambda 2}/\theta_{B\lambda 2}$ is most nearly 1.0;

d) determining values for the groove frequency f for each order $m_1$, in accordance with the equation $f=1/\{(m_1+1)\lambda_1 - m_1\lambda_1/2\}$, wherein the next higher order does not propagate;

e) selecting a value of said groove frequency f which yields the smallest positive difference between said diffraction angles $\theta_{B\lambda 1}$ and $\theta_{B\lambda 2}$; and f) ruling a grating substrate to form a grating master in accordance with said selected values for facet angle, apex angle, and groove frequency.

16. A method in accordance with claim 14 comprising the further step of adding a bias constant to said determined values of frequency f.

* * * * *

UNITED STATES PATENT AND TRADEMARK OFFICE
CERTIFICATE OF CORRECTION

PATENT NO. : 6,067,197
DATED : May 23, 2000
INVENTOR(S) : Thomas C. Blasiak
Semyon L. Zheleznyak It is certified that error appears in the above-identified patent and that said Letters Patent are hereby corrected as shown below:

As set forth in the original patent application please correct the word DIFRACTION in the patent title Page One Line [54] as follows:

DIFFRACTION

Signed and Sealed this

Twenty-fourth Day of April, 2001

Attest:

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 6,067,197
DATED : May 23, 2000
INVENTOR(S) : Thomas C. Blasiak, Semyon L. Zheleznyak It is certified that error appears in the above-identified patent and that said Letters Patent is hereby corrected as shown below:

<u>Title page,</u>
Item [54] line 1 and column 1, line 1, delete "DIFRACTION" and insert therefor -- DIFFRACTION --.

Signed and Sealed this

Ninth Day of October, 2001

Attest:

*Nicholas P. Godici*

NICHOLAS P. GODICI
*Attesting Officer*    *Acting Director of the United States Patent and Trademark Office*